United States Patent
Fang et al.

(10) Patent No.: US 10,874,968 B2
(45) Date of Patent: Dec. 29, 2020

(54) MULTILAYER FILTER SCREEN AND MANUFACTURING METHOD THEREOF

(71) Applicant: FANNO TECHNOLOGIES CO., LTD, Taichung (TW)

(72) Inventors: Yu-Hsun Fang, Taichung (TW); Pi-Min Lin, Taichung (TW); Chi-Han Chen, Taichung (TW)

(73) Assignee: FANNO TECHNOLOGIES CO., LTD., Taichung (TW)

( * ) Notice: Subject to any disclaimer, the term of this patent is extended or adjusted under 35 U.S.C. 154(b) by 352 days.

(21) Appl. No.: 16/001,560

(22) Filed: Jun. 6, 2018

(65) Prior Publication Data
US 2019/0374893 A1    Dec. 12, 2019

(51) Int. Cl.
*B01D 53/22* (2006.01)
*B01D 46/00* (2006.01)
*B01D 39/16* (2006.01)
*B01D 46/50* (2006.01)
*B01D 46/10* (2006.01)

(52) U.S. Cl.
CPC ..... *B01D 46/0032* (2013.01); *B01D 39/1692* (2013.01); *B01D 46/0001* (2013.01); *B01D 46/0057* (2013.01); *B01D 46/10* (2013.01); *B01D 46/50* (2013.01); *B01D 2239/0435* (2013.01); *B01D 2275/205* (2013.01)

(58) Field of Classification Search
CPC ................ B01D 46/0001; B01D 46/10; B01D 2239/0435; B01D 46/50; B01D 39/1692; B01D 46/0032; B01D 2275/205; B01D 46/0057
See application file for complete search history.

(56) References Cited

U.S. PATENT DOCUMENTS

| | | | | |
|---|---|---|---|---|
| 4,830,062 A | * | 5/1989 | Yamamoto | B01D 39/1692 138/177 |
| 5,028,036 A | * | 7/1991 | Sane | B01D 29/03 266/227 |
| 5,045,111 A | * | 9/1991 | Sane | C04B 38/065 75/407 |
| 5,593,583 A | * | 1/1997 | Geldmacher | B01D 33/503 210/331 |
| 6,271,968 B1 | * | 8/2001 | Dobrowolski | G02B 27/283 359/485.06 |
| 7,673,757 B2 | * | 3/2010 | Yavorsky | B01J 20/165 210/502.1 |
| 2004/0134847 A1 | * | 7/2004 | Lin | C02F 1/005 210/202 |
| 2004/0238440 A1 | * | 12/2004 | Clendenning | B01D 29/353 210/493.4 |
| 2012/0000845 A1 | * | 1/2012 | Park | B01D 67/0083 210/500.25 |

(Continued)

*Primary Examiner* — Anthony R Shumate
(74) *Attorney, Agent, or Firm* — Muncy, Geissler, Olds & Lowe, P.C.

(57) ABSTRACT

A multilayer filter screen and the manufacturing method thereof are provided. The multilayer filter screen includes a conductive powder layer and a plastic powder layer. The conductive powder layer and the plastic powder layer are stacked up through a solidifying process. Therefore, the mechanical structural strength and the anti-static electricity function of the multilayer filter screen are improved.

15 Claims, 4 Drawing Sheets

(56) References Cited

U.S. PATENT DOCUMENTS

| | | | |
|---|---|---|---|
| 2012/0223017 A1* | 9/2012 | Park | B82Y 30/00 |
| | | | 210/650 |
| 2013/0011654 A1* | 1/2013 | Han | C04B 35/62863 |
| | | | 428/293.4 |
| 2013/0277035 A1* | 10/2013 | Hu | C04B 35/522 |
| | | | 165/185 |
| 2019/0247773 A1* | 8/2019 | Schuster | B01D 39/18 |

* cited by examiner

MULTILAYER FILTER SCREEN AND MANUFACTURING METHOD THEREOF

BACKGROUND OF THE INVENTION

1. Field of the Invention

The present invention relates to filter screens, and more particularly, to a multilayer filter screen.

2. Description of the Related Art

As the consciousness of environmental protection rising, people gradually pay more attention to the ecological environment and quality of air. To reduce dust pollution during industrial manufacturing process, a dust cleaner is usually applied for preventing dust from polluting the air.

In the dust cleaning process, an exhauster produce powerful air exhaustion through the filter screen of the dust cleaner, such that dust in the air will be attached to the filter screen, thereby removing the dust from the air. When the dust attached to the filter screen is to be cleansed from the filter screen, a compressed air is applied for spurting a high-speed and high-pressure air stream, such that the screen filter rapidly expands to shake off the dust, achieving the dust cleaning function.

A conventional filter screen is formed of a plastic material and an electrically conductive material, wherein the plastic material enhances the structural strength of the filter screen, and the electrically conductive material is applied for preventing the dust from generating a static electricity which may cause explosion.

A conventional manufacturing method of a filter screen includes steps of: mixing the powder of a plastic material and the powder of an electrically conductive material to form a powder mixture; and placing the powder mixture in a mold to form a composite sheet through a sintering process of the powder mixture.

Based on the fact that the electrically conductive powder particle will be included among the plastic powder particles, the plastic powder particles are prevented from being completely combined with each other. After the solidifying process, the overall structural strength between each plastic powder particle is lowered, causing a less than optimal mechanic structural strength of the finished filter screen. As a result, during the dust removing and dust cleansing process, the filter screen may deform due to repeatedly compression and expansion caused by the powerful air stream, such that the filter screen is structurally weakened, so as to be easily damaged and deprived of the dust removing function after a long period of usage.

Furthermore, the plastic powder particles will also be included among the electrically conductive powder particles. After the solidifying process, the overall structural strength between each conductive powder particle is lowered, thus unable to improve the anti-static electricity capability of the filter screen. As a result, during the dust removing and dust cleansing process, static electricity may be generated between the filter screen and the dust, further causing a possibility of a hazardous explosion.

SUMMARY OF THE INVENTION

For improving the issues above, a multilayer filter screen is disclosed. With several layers of material being stacked up, the overall structural strength of the filter screen is improved, and the anti-static electricity capability is enhanced.

Also, a manufacturing method of a multilayer filter screen is disclosed for simplifying the steps and the cost of manufacturing the filter screen.

A multilayer filter screen in accordance with an embodiment of the present invention comprises:
 a conductive powder layer; and
 a plastic powder layer attached to one side of the conductive powder layer, such that the conductive powder layer and the plastic powder layer are combined through a solidifying process.

With such configuration, the present invention combines the conductive powder layer and the plastic powder layer to form a multilayer filter screen, such that the conductive powder and the plastic powder are prevented from being mixed with each other, further improving disadvantages caused by conventional powder mixture. Also, structural strength of the plastic powder layer and the conductive powder layer are assured, thereby improving the mechanical structure and the anti-static electricity function.

A method of manufacturing a multilayer filter screen in accordance with an embodiment of the present invention comprises following steps:
 evenly laying a conductive powder material layer in a mold;
 placing a plastic powder material layer on the conductive powder material layer; and
 solidifying the conductive powder material layer to form a conductive powder layer, and solidifying the plastic powder material layer to form a plastic powder layer, such that the conductive powder layer and the plastic powder layer are stacked to form a multilayer filter screen through the solidifying process.

With such method, the conductive powder material layer and the plastic powder material layer are respectively placed in the mold, assuring the structural strength of the plastic powder layer and the conductive powder layer, thus effectively improving the mechanical structure and the anti-static electricity function of the multilayer filter screen.

Further, in the manufacturing process of the multilayer filter screen in accordance with the present invention, a high-intensity and high-anti-static electricity multilayer filter screen is formed in a single solidifying step. Therefore, the manufacturing process of the present invention is simplified, further lowering the cost of manufacture.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Figure 1:
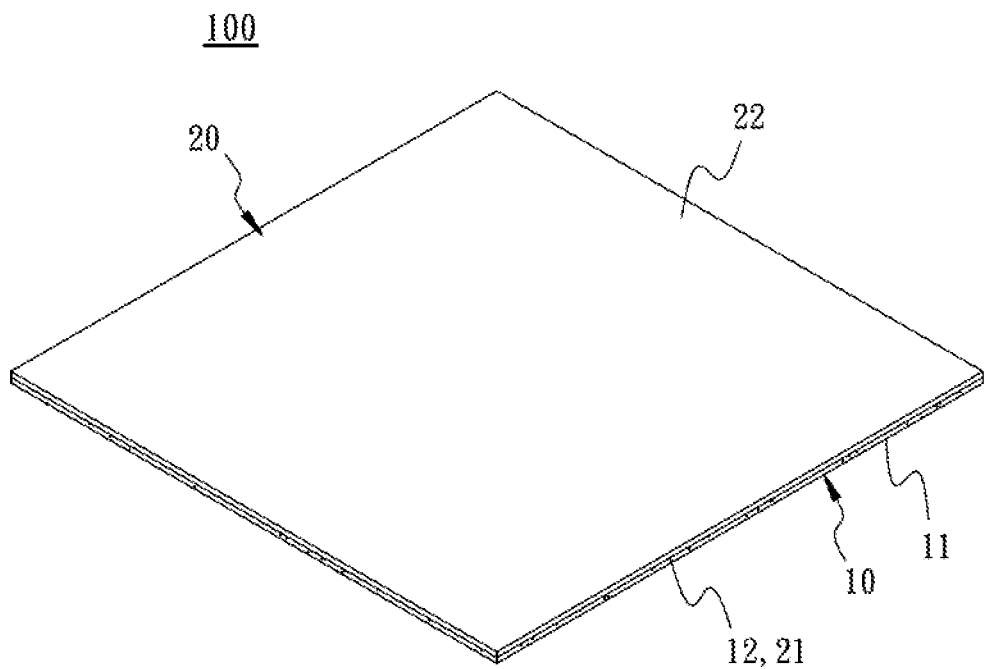
FIG. 1 is a perspective view of the multilayer filter screen in accordance with an embodiment of the present invention.
Figure 2:
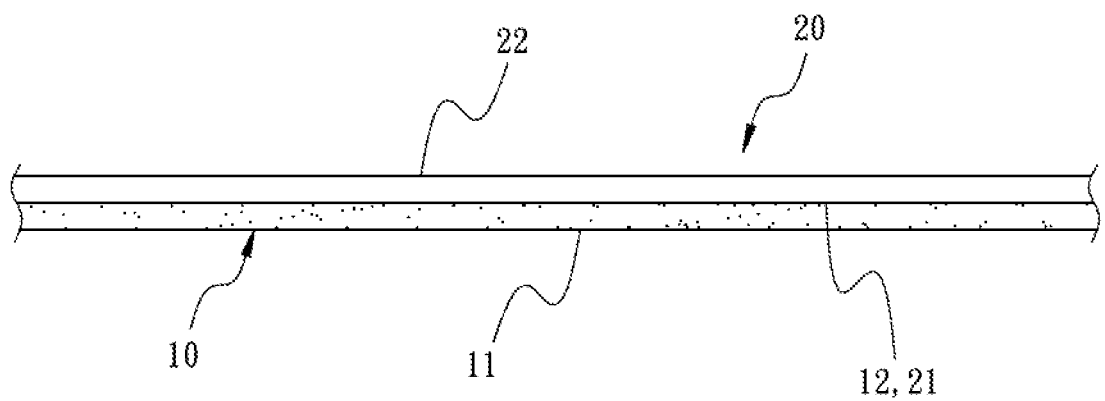
FIG. 2 is a side view of FIG. 1.

Referring to FIG. 1 to FIG. 2, a multilayer filter screen 100 in accordance with an embodiment of the present invention comprises a conductive powder layer 10 and a plastic powder layer 20.

The conductive powder layer 10 is formed of an electrically conductive powder material. The thickness of the conductive powder layer 10 is defined as a first thickness, wherein the first thickness of the conductive powder layer 10 relates to the electrical conductivity of the multilayer filter screen 100, such that a greater thickness brings a better conductivity. The conductive powder layer 10 comprises a first conductive face 11 and a second conductive face 12. Also, the conductive powder material for forming the conductive powder layer 10 is allowed to be carbon black powder or aluminum powder. In an embodiment of the present invention, the conductive powder layer 10 is formed of carbon black powder.

The plastic powder layer 20 is formed of a plastic powder material. In an embodiment of the present invention, the plastic powder material is a polypropylene (PP) material. The thickness of the plastic powder layer 20 is defined as a second thickness, wherein the second thickness of the plastic powder layer 20 relates to the structural strength of the multilayer filter screen 100, such that a greater second thickness brings a greater structural strength. The second thickness is allowed to be equal or unequal to the first thickness. In an embodiment of the present invention, the second thickness is equal to the first thickness. The plastic powder layer 20 comprises a first plastic face 21 and a second plastic face 22. The first plastic face 21 of the plastic powder layer 20 completely covers the second conductive face 12 of the conductive powder layer 10.

Also, the conductive powder layer 10 and the plastic powder layer 20 are stacked up through a solidifying process, so as to form the multilayer filter screen 100.

The manufacturing method of the multilayer filter screen 100 in accordance with the aforementioned embodiment comprises following steps.

First, the conductive powder material is evenly laid to reach the first thickness in a housing space of a mold to form a conductive powder layer, wherein the first thickness is allowed to be adjusted according to the user demand.

Next, the plastic powder material is evenly laid to reach the second thickness upon the conductive powder material layer in the housing space of the mold to form a plastic powder material layer, wherein the second thickness is allowed to be adjusted according to the user demand. In an embodiment of the present invention, the second thickness is equal to the first thickness.

Then, carry out a solidifying process to form the conductive powder material layer into the conductive powder layer 10 and form the plastic powder material layer into the plastic powder layer 20, wherein the conductive powder layer 10 and the plastic powder layer 20 are stacked up to form the multilayer filter screen 100 by the solidifying process. In an embodiment of the present invention, the multilayer filter screen 100 is formed in a rectangular shape. However, the multilayer filter screen 100 is allowed to be formed in any shapes according to the user demand.

In addition, the solidifying process is allowed to be a sintering process or a melting process. In an embodiment of the present invention, the solidifying process is a sintering process, wherein the sintering temperature ranges from 150 to 250 Celsius degrees. For further illustration, the solidifying process melts the conductive powder material with a high temperature, such that the melted conductive powder material becomes viscous. Therefore, each conductive powder material particle is combined with each other, thereby forming the sheet shaped conductive powder layer 10. Similarly, the solidifying process melts the plastic powder material, such that the melted plastic powder material becomes viscous. Therefore, each plastic powder material particle is combined with each other, thereby forming the sheet shaped plastic powder layer 20. Subsequently in the solidifying process, the conductive powder layer 10 and the plastic powder layer 20 are stacked up in a pressing manner, so as to form the multilayer filter screen 100. Therefore, the structural strength of the conductive powder layer 10 and the plastic powder layer 20 are assured. With the second thickness of the plastic powder layer 20 and the first thickness of the conductive powder layer 10 being equal, the multilayer filter screen 100 in accordance with an embodiment of the present invention acquires a balanced structural strength and electrical conductivity, thereby effectively improving the mechanical structure and the anti-static electricity function of the multilayer filter screen 100.

When the multilayer filter screen 100 of the embodiment is applied to a dust cleaner, the first conductive face 11 of the conductive powder layer 10 faces toward the outer side of the dust cleaner, and the second plastic face 22 of the plastic powder layer 20 faces toward the inner side of the dust cleaner. As the dust cleaner removes dust from the air, the exhauster of the dust cleaner exhausts a power air stream toward the multilayer filter screen 100 in the dust cleaner, forcing the dust in the air to be attached to the first conductive face 11 of the conductive powder layer 10, and the conductive powder layer 10 is capable of reducing the possibility of the occurrence of static electricity, so as to prevent a possible explosion.

Further, when the dust attached to the multilayer filter screen 100 is to be cleansed off, the user is able to apply a compressed air to spurt a high-speed and high-pressure air stream from the second plastic face 22 of the plastic powder layer 20 toward the first conductive face 11 of the conductive powder layer 10, such that the multilayer filter screen 100 rapidly expands to shake off the dust for cleansing the dust off from the multilayer filter screen 100. During such dust cleansing process, the multilayer filter screen 100 undergoes a compressing or expanding motion, and the plastic powder layer 20 improves the mechanical structural strength of the multilayer filter screen 100, so as to prevent the multilayer filter screen 100 from damage caused by the compressing or expanding effects, and increase the service life of the multilayer filter screen 100.

Figure 3:
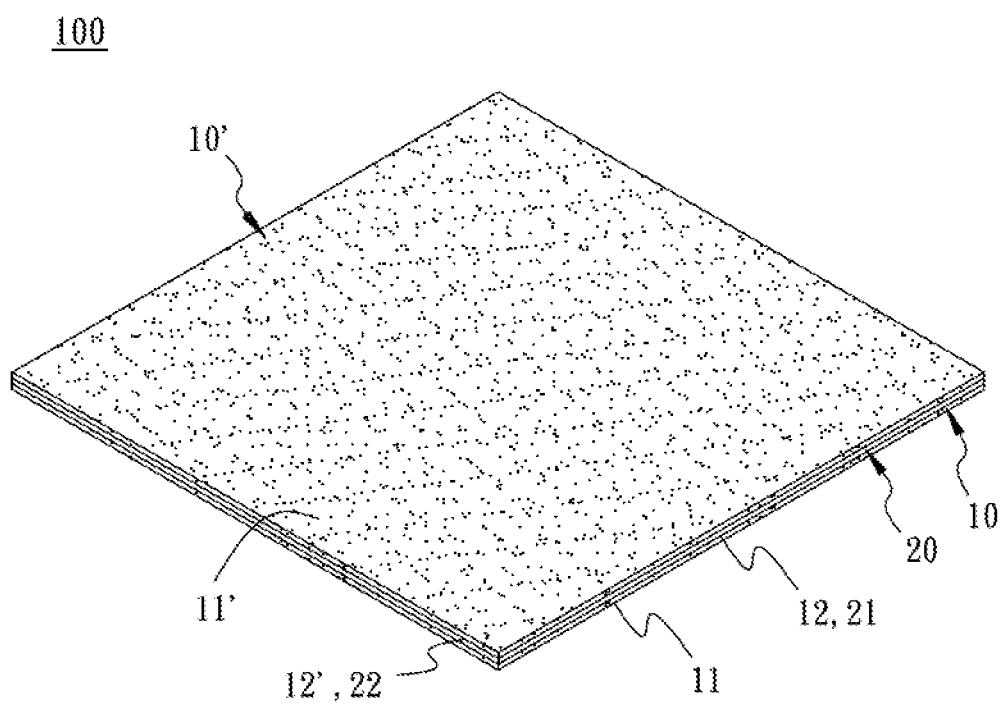
FIG. 3 is a perspective view of the multilayer filter screen in accordance with another embodiment of the present invention.
Figure 4:
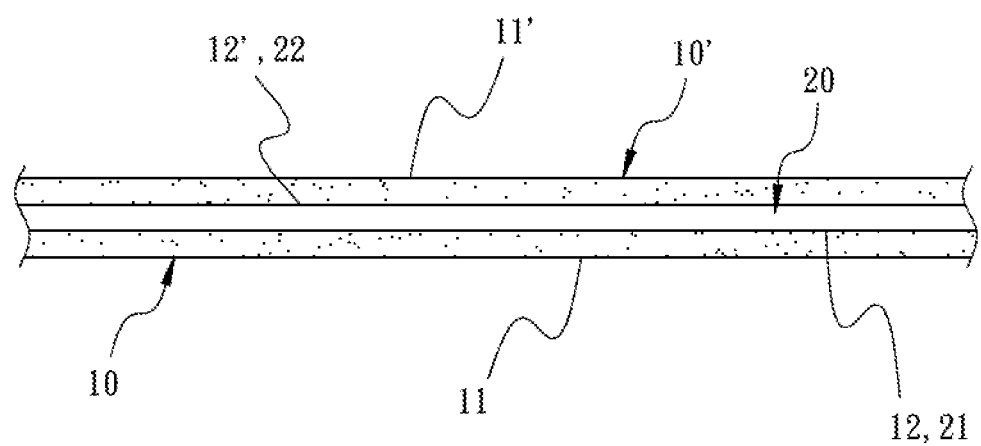
FIG. 4 is a side view of FIG. 3.

Referring to FIG. 3 to FIG. 4, the multilayer filter screen 100 in accordance with the second embodiment of the present invention is illustrated, wherein the explanation of identical reference numbers in the drawings are herein omitted. The difference between the second embodiment and the first embodiment will be illustrated.

In the multilayer filter screen 100 in accordance with the second embodiment, a first conductive powder layer 10 and a second conductive powder layer 10' are provided, with the plastic powder layer 20 disposed between the first and second conductive powder layers 10,10'. The first plastic face 21 of the plastic powder layer 20 completely covers the second conductive face 12 of the first conductive powder layer 10, and the second plastic face 22 of the plastic powder layer 20 is covered by the second conductive face 12' of the second conductive powder layer 10'. The two conductive powder layers 10,10' are combined with the plastic powder layer 20 by the solidifying process, wherein the conductive powder materials applied to form the first and second conductive powder layers 10,10' are allowed to be identical or different from each other.

The manufacturing method of the multilayer filter screen 100 in accordance with the second embodiment comprises following steps.

First, the first conductive powder material is evenly laid to reach the first thickness in a housing space of a mold to form a first conductive powder material layer, wherein the first thickness is allowed to be adjusted according to the user demand.

Next, the plastic powder material is evenly laid to reach the second thickness upon the first conductive powder material layer in the housing space of the mold to form a plastic powder material layer.

Next, the conductive powder material is again evenly laid upon the plastic powder material layer to form a second conductive powder material layer, such that the plastic powder material layer is sandwiched between the first conductive powder material layer and second conductive powder material layer.

Then, carry out a solidifying process to form the two conductive powder material layers into the first conductive powder layer 10 and the second conductive powder layer 10', and also to form the plastic powder material layer into the plastic powder layer 20, wherein the first and second conductive powder layers 10,10' have a first conductive face 11,11' and a second conductive face 12,12', respectively, and the first and second conductive powder layers 10,10' are stacked up with the plastic powder layer 20 to form the multilayer filter screen 100 by the solidifying process in a pressing manner. In the embodiment of the present invention, the multilayer filter screen 100 is formed in a rectangular shape. However, the multilayer filter screen 100 is allowed to be formed in any shapes according to the user demand.

When the multilayer filter screen 100 in accordance with the second embodiment is applied to a dust cleaner, the exhauster of the dust cleaner exhausts a power air stream toward the multilayer filter screen 100 in the dust cleaner, forcing the dust in the air to be attached to the first conductive face 11 of the conductive powder layer 10. With two conductive powder layers 10,10', the possibility of the occurrence of static electricity is further reduced, so as to effectively prevent a possible explosion and further increase the safety during operation. With such configuration, the present invention achieves following objectives.

The conductive powder layer 10 and the plastic powder layer 20 are stacked up to form the multilayer filter screen 100, such that the conductive powder layer 10 and the plastic powder layer 20 are prevented from being mixed with each other. Therefore, the structural strength of the conductive powder layer 10 and the plastic powder layer 20 are assured, thus improving the mechanical structure and the anti-static electricity function of the multilayer filter screen 100.

During the dust removing or dust cleansing process, the plastic powder layer 20 improves the mechanical structural strength of the multilayer filter screen 100, so as to prevent the multilayer filter screen 100 from damage due to compressing or expanding motions, thus increasing the service life of the multilayer filter screen 100.

In the manufacturing process of the multilayer filter screen 100 in accordance with the present invention, the high-intensity and high-anti-static electricity multilayer filter screen 100 is formed in a single solidifying step. Therefore, the manufacturing process of the present invention is simplified, further lowering the cost of manufacture Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A multilayer filter screen, comprising:
    a first conductive powder layer, having a first conductive face and a second conductive face in opposite to the first conductive face; and
    a plastic powder layer, having a first plastic face and a second plastic face in opposite to the first plastic face, the first plastic face attached to the second conductive face, the first conductive powder layer and the plastic powder layer being formed and stacked up through a solidifying process.

2. The multilayer filter screen of claim 1, wherein the plastic powder layer completely covers the second conductive face of the first conductive powder layer.

3. The multilayer filter screen of claim 1, wherein the solidifying process is chosen from a group consisting of a sintering process and a melting process.

4. The multilayer filter screen of claim 1, wherein a material for forming the first conductive powder layer is chosen from a group consisting of carbon black powder and aluminum powder.

5. The multilayer filter screen of claim 1, further comprising a second conductive powder layer, with the plastic powder layer disposed between the first and second conductive powder layers, the first plastic face of the plastic powder layer covering the second conductive face of the first conductive powder layer, and the second plastic face of the plastic powder layer being covered by a second conductive face of the second conductive powder layer.

6. The multilayer filter screen of claim 5, wherein the two conductive powder layers and the plastic powder layer are combined through the solidifying process.

7. The multilayer filter screen of claim 5, wherein the solidifying process is chosen from a group consisting of a sintering process and a melting process.

8. The multilayer filter screen of claim 5, wherein the first conductive powder layer and the second conductive powder layer are formed of different materials.

9. The multilayer filter screen of claim 5, wherein the first conductive powder layer and the second conductive powder layer are formed of identical materials.

10. The multilayer filter screen of claim 5, wherein the materials for forming the first conductive powder layer and the second conductive powder layer are chosen from a group consisting of carbon black powder and aluminum powder, respectively.

11. A manufacturing method of a multilayer filter screen, comprising following steps:
    (a) evenly laying a first conductive powder material layer in a mold;
    (b) laying a plastic powder material layer upon the first conductive powder material layer; and
    (c) carrying out a solidifying process, so as to form the first conductive powder material layer into a first conductive powder layer and form the plastic powder material layer into a plastic powder layer, such that the first conductive powder layer and the plastic powder layer are stacked up to form the multilayer filter screen through the solidifying process.

12. The manufacturing method of claim 11, wherein the plastic powder material layer is evenly laid upon the first conductive powder material layer.

13. The manufacturing method of claim 11, wherein the solidifying process is chosen from a group consisting of a sintering process and a melting process.

14. The manufacturing method of claim 11, wherein in step (b), after laying the plastic powder material layer, further laying a second conductive powder material layer upon the plastic powder material layer, such that in step (c), the solidifying process also forms the second conductive powder material layer into a second conductive powder layer, thus forming the plastic powder layer between the first and second conductive powder layers.

15. The manufacturing method of claim 14, wherein the solidifying process is chosen from a group consisting of a sintering process and a melting process.

* * * * *